Nov. 19, 1968  R. B. GREGORY ET AL  3,411,179

EXTRUDER SCREW MIXING SECTION

Filed April 12, 1966  2 Sheets-Sheet 1

INVENTORS.
ROBERT B. GREGORY
LOUIS F. STREET

BY *F. J. Pisarra*

ATTORNEY

Nov. 19, 1968  R. B. GREGORY ET AL  3,411,179
EXTRUDER SCREW MIXING SECTION

Filed April 12, 1966  2 Sheets-Sheet 2

INVENTORS.
ROBERT B. GREGORY
LOUIS F. STREET
BY F. J. Pisarra
ATTORNEY

United States Patent Office 3,411,179
Patented Nov. 19, 1968

3,411,179
EXTRUDER SCREW MIXING SECTION
Robert B. Gregory, Flemington, and Louis F. Street, Hampton, N.J., assignors to Frank W. Egan & Company, Somerville, N.J., a corporation of New Jersey
Filed Apr. 12, 1966, Ser. No. 542,137
7 Claims. (Cl. 18—12)

ABSTRACT OF THE DISCLOSURE

A plastic extrusion machine including a rotary screw unit having a mixing section at its forward end, formed with at least one helical feed channel and at least one helical discharge channel. The feed and discharge channels are so configured as to improve the dispersive mixing ability of the screw in use, i.e. simultaneously apply high shear stress upon the higher viscosity thermoplastic constituents and low shear stress upon the lower viscosity thermoplastic constituents, and thereby attain improved viscosity and tempertaure homogeneity of the resulting extrudate.

---

This invention relates to extruder screws of the general type used in the extrusion of thermoplastics, and, more particularly, to an improved mixing section that may be advantageously employed as a part of such an extruder screw.

There have been a number of advances, during the past twenty years, in the art of thermoplastic extrusion machines utilizing extruder screws and intended to improve the mixing capabilities of the screws by providing the same with mixing sections of various configurations. These advances are exemplified by the prior art structures disclosed in Dulmage Patent No. 2,453,088, Henning Patent No. 2,496,625, Zona Patent No. 2,765,490, Lasch Patent No. 2,868,517, Saxton Patent No. 3,006,029 and Vesilind Patent No. 3,221,369. While those and related prior art structures have contributed to the development of the art and have achieved a measure of success in improving the quality of the extrudate, none has been entirely satisfactory, especially as regards ability to attain good dispersive and distributive mixing of plastics, as will be referred to further along herein.

One of the heretofore unsolved problems in extruding thermoplastics employing screw extruders, which are required to operate at high productions rates, is the loss in temperature homogeneity of the extrudates. Due to the typical inverse relationship of viscosity of a thermoplastic composition with its temperature, a wide range of temperatures results in an uneven output flow through an extrusion die. This is caused by the fact that, in addition to other variables, the flow rate through a die is proportant to the extrudate viscosity. It is, therefore, important and highly desirable that an isothermal melt temperature condition for the extrudate be attained or closely approximated in order that the die output flow rate will remain substantially constant within the permissible tolerances for a particular operation.

It is known to the art that temperature homogeneity is a function of the mixing involved in screw extrusion thermoplastic procedures. One form of such mixing is defined as the simultaneous application of high shear stress on the higher viscosity constituents of the extrudate and a lower shear stress on the lower viscosity constituents, thereby supplying more energy to the higher viscosity constituents than to the lower. This phase of mixing is generally referred to as "dispersive mixing."

It is also known that temperature homogeneity is a function of the distributive mixing ability of the screw.

Distributive mixing is in turn a function of the spatial separation at the discharge of two particles of the thermoplastic polymer which were adjacent at the feed end of the screw. It has been established that the more widely separated the particles become, as a result of the mixing procedure, the more uniform the extrudate temperature.

Besides its effect on temperature homogeneity, the extruder mixing function is of importance in other aspects of thermoplastics processing, such as color mixing wherein one or more pigments are added to a plastic composition to obtain a final product having a predetermined color. Other aspects of processing include the blending of two or more different polymers, the blending of two or more compositions of the same polymer having different viscosities, the mixing and blending of various additives to the polymers and the like.

The primary object of this invention is to provide an extrusion screw mixing section having its parts so configured and arranged as to improve the dispersive mixing ability of the screw when in active service, i.e. simultaneously applying high shear stress upon the higher viscosity thermoplastic constituents and low shear stress upon the lower viscosity thermoplastic constituents, whereby to attain improved viscosity and temperature homogeneity of the extrudate.

Another object of this invention is to provide an extrusion screw mixing section that is adapted to attain good distributive mixing of thermoplastic constituents.

It is a further object of this invention to provide an extrusion screw mixing section which subjects all of the constituents of a thermoplastic extrudate to thorough dispersive and distributive mixing.

A still further object of this invention is to provide an extrusion screw mixing section which operates with minimum back pressure and temperature rise of the extrudate and which avoids creation in the screw of "dead spots" or like regions where normal advancement of portions of the extrudate may be retarded and, as a consequence, undergo degradation.

The enumerated objects and additional objects, as well as the advantages of this invention, will be readily apparent to persons trained in the art from the following detailed description taken in conjunction with the accompanying drawings which describe and illustrate a recommended construction embodying the invention.

In the drawings, wherein like reference numerals denote corresponding parts in the several views.

Figure 1:
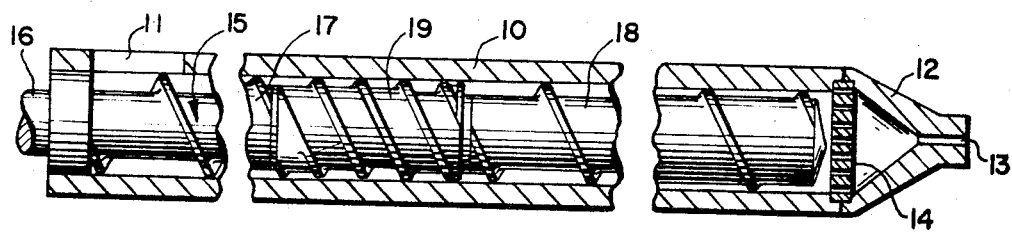
FIG. 1 is a central longitudinal sectional view through a plastics extruder barrel having an extrusion screw which includes a mixing section according to this invention, parts being broken away for convenience in illustrating.

Reference is first had to FIG. 1 of the drawings which illustrates a cylindrical barrel 10 of a conventional extrusion machine. The barrel is provided at its rear end with a feed inlet 11 for admission of plastic material by way of a feed hopper (not shown). The barrel is equipped at its forward end with a discharge head 12 having an extrusion orifice 13. A perforate plate 14, which serves as a strainer for the extrudate, is disposed across the forward end of the barrel in the region of its juncture with the discharge head.

Positioned within barrel 10 is an extrusion screw 15 having an axial extension 16 which is adapted to be coupled to the usual rotary drive means (not shown) of the extrusion machine. In the illustrated embodiment of the invention, screw 15 consists of three sections, namely a rear section 17, a front section 18 and an intermediate or mixing section 19. Screw sections 17 and 18 are preferably of known design and, for this reason, it is not deemed necessary to describe their construction, function and operation. The three screw sections may be integral or separable, as desired or required by particular size and operational conditions.

Extruder screw mixing section 19, which is illustrative of our present invention, will now be described. Screw mixing section 19 is provided with a plurality of substantially coaxial and preferably equi-spaced, generally helical, flights or dams 20, 21, 22 and 23 and is formed with a plurality of generally helical grooves or channels A, B, C and D. As shown, the several channels are defined in part by corresponding pairs of flights: Channel A by flights 20 and 21, channel B by flights 21 and 22, channel C by flights 22 and 23 and channel D by flights 23 and 20. Each channel extends approximately 360° about the axis of mixing section 19 in the embodiment shown.

Figure 2:
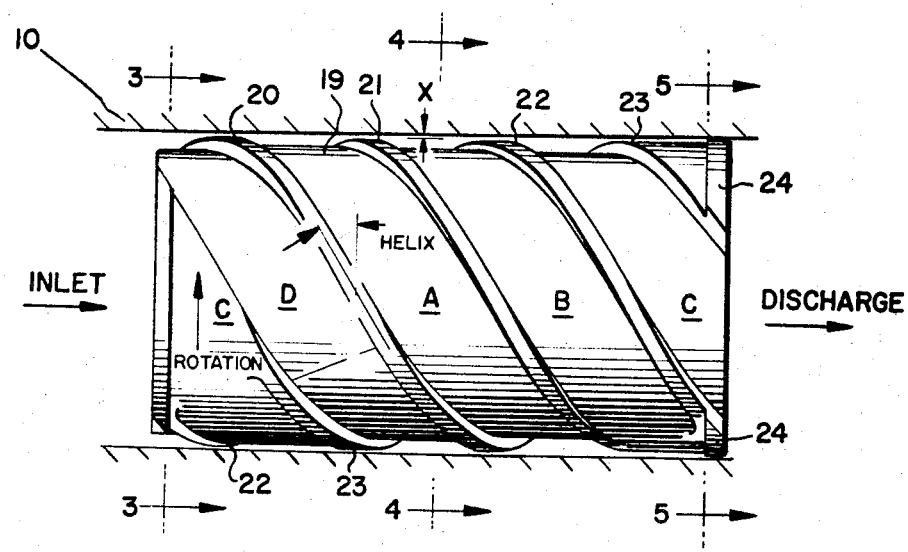
FIG. 2 is an enlarged side elevation view of the extrusion screw mixing section shown in FIG. 1.
Figure 3:
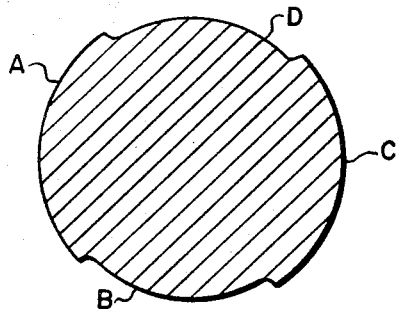
FIG. 3 is a view in cross-section taken along line 3—3 of FIG. 2.
Figure 4:
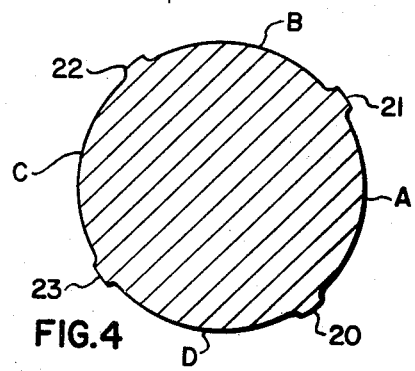
FIG. 4 is a view in cross-section taken along line 4—4 of FIG. 2.
Figure 5:
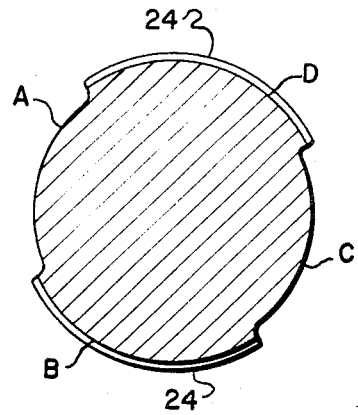
FIG. 5 is a view in cross-section taken along line 5—5 of FIG. 2.

The peripheral surfaces of flights 20, 21, 22 and 23 are portions of the surface of revolution of a right circular cylinder, so that the diameter over the flights is constant throughout the length of the mixing section. Accordingly, the small clearance distance between a flight and the inner surface of the barrel, as indicated at X in FIG. 2, is the same for all flights. Also, the several flights are preferably parallel, as shown.

It is to be understood that, if desired, the clearance distance between the flights and the inner surface of the barrel may be varied from one end of the mixing section 19 to the other end, instead of being constant. Thus, the flights and/or the barrel bore may be so formed as to provide an increasing clearance from the inlet end to the discharge end of the mixing section, a decreasing clearance from the inlet end to the discharge end, an increasing clearance and then a decreasing clearance from the inlet end to the discharge end, or a decreasing clearance and then an increasing clearance from the inlet end to the discharge end. However, regardless of whether the clearance distance lengthwise of the mixing section is constant or varies, the clearance over all flights at any selected transverse cross section of the mixing section should be equal for best results.

The clearance distance $x$ depends on several factors including the viscosity of the plastic material and the rate of operation of the machine. For satisfactory results, the clearance distance should be within the range of about 0.2% to about 3% of the diameter of the barrel bore. Clearance distance values in the lower part of this range are recommended for relatively low viscosity materials and/or low rate operation of the machine, while clearance distance values in the upper part of the range are recommended for relatively high viscosity materials and/or high rate operation of the machine. It is also recommended that the clearance distance be approximately 0.5% of the diameter of the barrel bore for average viscosity materials.

Channels B and D are preferably identical and each tapers in depth, such depth being greatest at the extrudate entering end, i.e. the end which communicates with screw section 17, and decreasing to the minimum practical clearance with the inside of barrel 10 at the exit end, i.e. the end adjoining screw section 18. Channels B and D constitute blind feed channels.

Channels A and C are also preferably identical. Each of these channels is similar to channels B and D but reversed in taper, the greatest depth being at the extrudate discharge end and the minimum depth being at the extrudate entering end. Channels A and C constitute discharge channels.

It will be observed that the feed channels and the discharge channels are arranged alternately. While the illustrated construction contemplates a pair of feed channels (channels B and D) and a pair of discharge channels (channels A and C), any desired number of feed and discharge channels may be employed, depending on overall design requirements. It will be appreciated that a particular design may require as few as one feed channel and one discharge channel.

Figure 6:
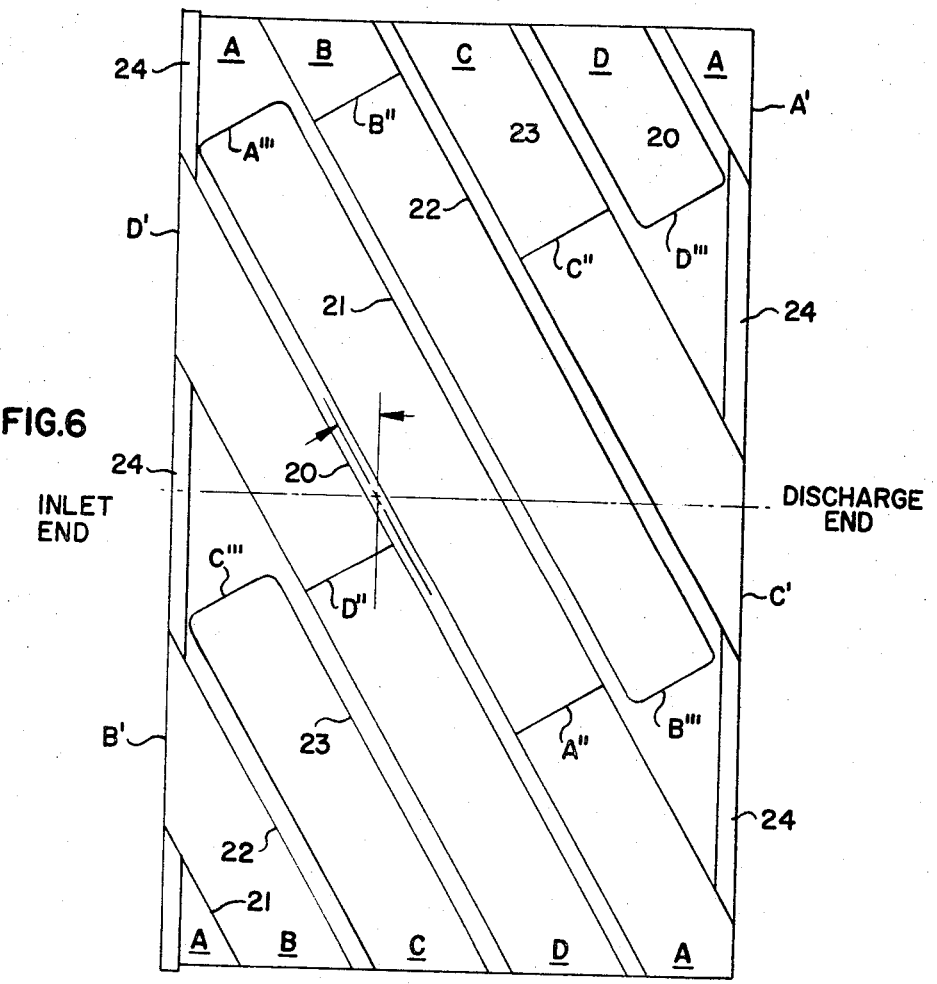
FIG. 6 is a development of the screw configuration shown in FIG. 2.

As is best shown in FIGURE 6, the preferred configuration of the feed channels B and D includes a section from point B' to B" and D' to D", respectively, having a constant channel depth, the depth then decreasing from points B" and D" to B''' and D''', respectively, where the channels end. In a like manner, the discharge channels A and C start at points A''' and C''', respectively, and increase in depth to points A" and C", respectively, from which points the depths remain constant to the discharge ends of the channels A' and C', respectively. It will be noted that points A''' and B", C" and D''', C''' and D", and A" and B''' are approximately in line with each other on opposite sides of their common flights.

In operation, plastic material is fed to the extruder through feed opening 11 in barrel 10 and is carried forward by rotation of the rear section 17 of screw 15. In the rear screw section, the plastic material is melted, undergoes some mixing action and is discharged into the entering end of the mixing section 19. At this point, the plastic extrudate consists of a molten non-homogenous mixture in respect to temperature and viscosity. The extrudate enters the mixing section through feed channels B and D and passes along these channels by the combined action of the pressure generated in the rear screw section and the forwarding action of the helical flights of the mixing section. As the extrudate passes points B" and D" in the feed channels, the lower viscosity and higher temperature components pass over the flights 21 and 23 into the discharge channels A and C, respectively. Due to the small clearance between the flights and the inside of the barrel, the higher viscosity and lower temperature components are unable to pass over the flights and are forced further through the decreasing depth feed channels. The increasing energy supplied to the plastic in the shallower channels raises the temperature and decreases the viscosity until the plastic is enabled to cross the flights into the discharge channels.

At the same time, a similar action occurs as the material passes over the flights. The material of higher viscosity is subjected to higher stress and greater temperature rise than the lower viscosity material as it passes through the close clearance $x$ (FIG. 2) between the flights and the inner surface of the barrel. This clearance is determined by the results desired.

From the discharge channels, the plastic flows into the front section 18 of the screw where the temperature and pressure are controlled by known means before the plastic is extruded through the strainer plate 14 and die orifice 13.

The above-outlined mode of operation of our invention refers to the plastic extrudate, which enters mixing section 19 through feed channels B and D, as consisting of a molten mixture. It is preferred and recommended that all of the extrudate entering the feed channels be in a molten condition to attain optimum temperature and viscosity homogeneity. However, an extrusion machine utilizing this invention functions in an entirely satisfactory manner even if all of the entering extrudate is not in a completely molten condition. In this connection, it is assumed, by way of example, that a minor portion of the extrudate entering the feed channels consists of unmelted or partially melted particles of the starting plastic material. Since the restricted clearance between the barrel and the flights prevents such particles from passing over the flights, the particles continue flowing along the feed channels until the increased working to which they are subjected, due to the decreasing feed channel depth, causes them to melt.

As shown in the drawings, the mixing section 19 is located between the two sections 17 and 18 of a two stage screw. However, in some applications the second stage screw 18 is omitted and the mixing section discharges directly to the strainer plate and orifice. Difficult mixing applications may require more than one mixing section; for example, a two stage screw may be provided with one mixing section between the two stages and another mixing section after the second stage.

The mixing section 19, in addition to its value in mixing the plastic, also provides a means of controlling the back pressure on the rear or first stage section of the screw. By proper selection of the helix angle of the flights of the mixing section, this back pressure can be increased or decreased, as desired. By increasing the helix angle to as much as 90° wherein the flights would be parallel to the axis of the screw, the back pressure would be a maximum since the mixing section would not provide any function as a material forwarding means.

Among other variables, in addition to the helix angle, which may be altered to suit particular operating conditions and materials, are the clearance between the flights and the barrel, the length of the mixing section, the channel depths and the number of channels. In some cases, it is desirable to provide interrupted shoulders at one or both ends of the mixing section, as shown at 24 in FIGURES 2 and 6. These shoulders have a larger diameter than the flights and thus prevent any material which may flow over the section between flights at the blind end of the channels from either directly entering the discharge channels at the inlet end or flowing directly from the feed channels to discharge at the discharge end.

It will be observed that all of the extrudate is required to pass through the small clearance over the flights between the feed and discharge channels and that all of this material is of substantially the same temperature and viscosity on leaving the mixing section.

As an example, a 4½″ extruder of 24 to 1 length to diameter ratio was operated in production using high impact polystyrene and extruding through a die to form a sheet of nominal .010 gauge thickness and 39½″ width. With a standard extruder screw without the mixing section, the variation in gauge was .0004″ at a production rate of 450 pounds per hour. A new screw incorporating a mixing section, as described herein in the preferred embodiment, was then installed with a resultant variation in gauge of .0002″, indicating a marked improvement in temperature and viscosity homogeneity of the extrudate. In addition, the production rate was increased to 770 pounds per hour with a desirable drop in extrudate temperature of from 490°F with the standard screw to 475°F with the screw incorporating the mixing section.

The mixing section which was incorporated in the screw of the above example was 8½″ long and was provided with two feed channels and two discharge channels. The inside diameter of the barrel was 4.500″ and the diameter over the flights of the mixing section was 4.469″, so that the clearance x was 0.0155″. The depth along the inlet end portion of each feed channel and along the discharge end portion of each discharge channel was 0.245″, as measured from the diameter of the flights. The helix angle of the flights was 30° and shoulders 24 had a diameter of 4.485″.

From the foregoing, it is believed that the objects, construction and operation of our present invention will be readily comprehended by persons skilled in the art without further description. Although the invention has been herein shown and described in a simple and practicable form, it is recognized that certain parts thereof are representative of other parts which may be used in substantially the same manner to accomplish substantially the same results. Therefore, it is to be understood that the invention is not to be limited to the exact details described herein, but is to be accorded the full scope and protection of the appended claims.

We claim:

1. In a plastic extrusion machine which includes a barrel having a cylindrical bore and a rotary screw unit within the bore for advancing plastic material therealong, the improvement comprising a screw mixing section positioned within the bore at the forward end of the screw unit and being coaxial and rotatable with the screw unit, the screw mixing section including a plurality of helical flights having the same hand as the screw unit, the flights being spaced from the bore, the peripheries of all flights at any selected transverse cross section of the mixing section being spaced the same distance from the bore, the distance between the periphery of each flight and the inner surface of the barrel being within the range of about 0.2% to about 3% of the diameter of the bore, the screw mixing section being formed with a helical feed channel and a helical discharge channel, the feed channel being defined in part by a successive pair of the flights, the discharge channel being defined in part by another successive pair of the flights, a portion of the feed channel progressively and uniformly decreasing in depth from its rear end to its front end, a portion of the discharge channel progressively and uniformly decreasing in depth from its front end to its rear end.

2. A machine according to claim 1 wherein the front end of the feed channel and the rear end of the discharge channel merge with the peripheries of corresponding flights.

3. A machine according to claim 1 wherein the flights are substantially of the same helical lead.

4. A machine according to claim 1 wherein the depth of the feed channel is substantially constant along its rear portion and tapers decreasingly along its front portion.

5. A machine according to claim 1 wherein the depth of the discharge channel tapers increasingly along its rear portion and is substantially constant along its front portion.

6. A machine according to claim 1 wherein the depth of the feed channel is substantially constant along its rear portion and tapers decreasingly along its front portion and the depth of the discharge channel tapers increasingly along its rear portion and is substantially constant along its front portion.

7. A machine according to claim 1 wherein one of the flights is common to both the feed channel and the discharge channel, wherein the front end of the feed channel and the rear end of the discharge channel merge with the peripheries of corresponding flights and wherein the depth of the feed channel is substantially constant along its rear portion and tapers decreasingly along its front portion and the depth of the discharge channel tapers increasingly along its rear portion and is substantially constant along its front portion.

References Cited

UNITED STATES PATENTS

| | | | |
|---|---|---|---|
| 2,511,203 | 6/1950 | Gliss. | |
| 3,123,860 | 3/1964 | Vesilind | 18—12 |
| 3,184,790 | 5/1965 | Araki | 18—12 |
| 3,271,819 | 9/1966 | Lacher | 18—12 |
| 3,296,659 | 1/1967 | Okazaki | 18—12 |

FOREIGN PATENTS 964,428  7/1964  Great Britain.

WILLIAM J. STEPHENSON, *Primary Examiner.*